May 11, 1943.  B. A. PROCTOR  2,318,628
SOUND TRANSLATING MACHINE
Filed March 19, 1940   5 Sheets-Sheet 2

INVENTOR
Barton A. Proctor
BY Moses & Nolte
ATTORNEYS

May 11, 1943.　　　　B. A. PROCTOR　　　　2,318,628
SOUND TRANSLATING MACHINE
Filed March 19, 1940　　　5 Sheets-Sheet 4
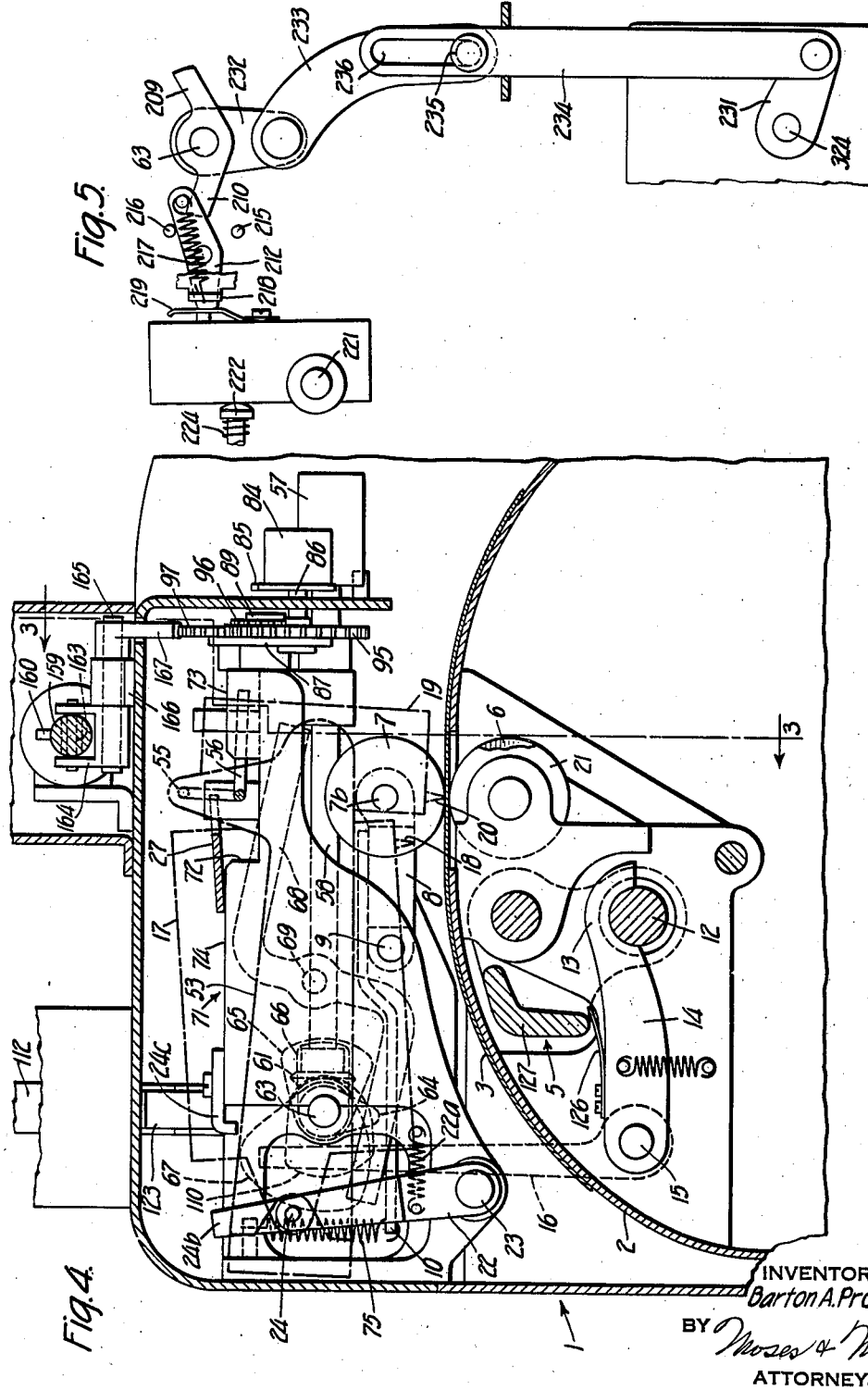
INVENTOR
Barton A. Proctor
BY Moses & Nolte
ATTORNEYS May 11, 1943.   B. A. PROCTOR   2,318,628
SOUND TRANSLATING MACHINE
Filed March 19, 1940   5 Sheets-Sheet 5
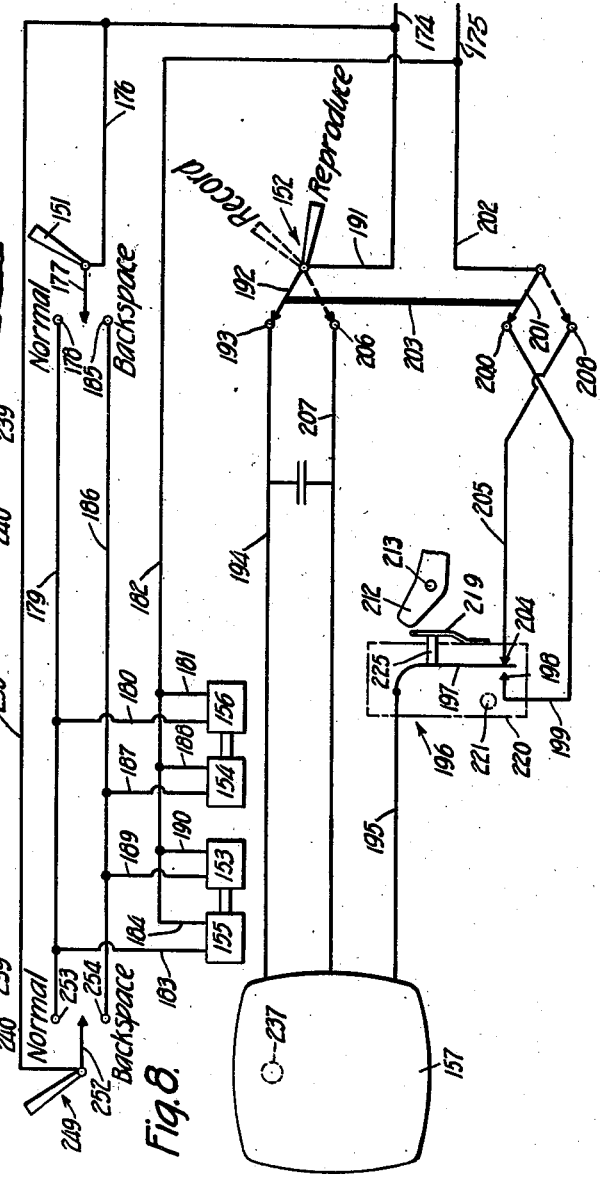
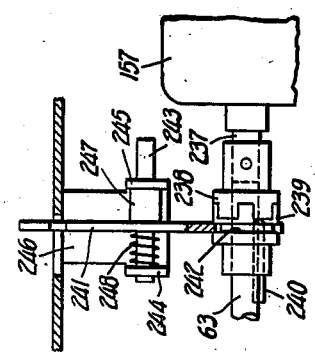
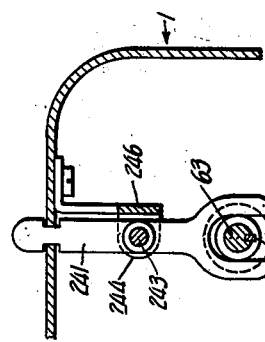
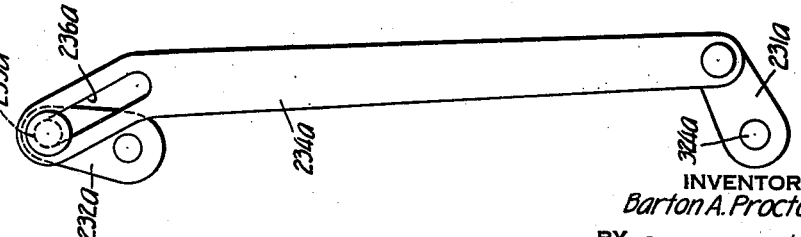
INVENTOR
Barton A. Proctor
BY Moses & Nolte
ATTORNEYS Patented May 11, 1943

2,318,628

UNITED STATES PATENT OFFICE 2,318,628

SOUND TRANSLATING MACHINE

Barton A. Proctor, Larchmont, N. Y., assignor to B. A. Proctor Company, Inc., New York, N. Y., a corporation of New York Application March 19, 1940, Serial No. 324,774

12 Claims. (Cl. 274—12)

This invention relates to sound recording and reproducing machines, and more particularly to machines used in the dictation and transcription of letters, memoranda and other writings. The invention has to do with improvements in dictation machines and is shown and described herein for illustrative purposes as embodied in a machine of the kind disclosed in the pending application of Barton A. Proctor and Ferdinand C. W. Thiede, Serial No. 218,082 filed July 8, 1938 for Sound recording and reproducing, now Patent No. 2,296,870, in the pending application of Barton A. Proctor, Serial No. 281,811, filed June 29, 1939, for Sound recording and reproducing, and in the pending application of Barton A. Proctor, Serial No. 453,202, filed August 1, 1942, for Sound recording and reproducing, as a division of Serial No. 281,811.

The primary object of the invention is to make provision in a dictation machine of remote control means for enabling the dictator quickly and conveniently to listen in to reproduction of a portion of the recorded matter, and then to restore the machine to the condition for recording.

In pending application Serial No. 281,811 disclosure is made of a dictation machine in which an operator, by a series of manual operations, is able to set the machine either for recording, for normal reproduction, or for back space reproduction and incidentally to effect appropriate alteration of electrical connections to recording and reproducing circuits. These features are desirably retained in the machine of the present application for the benefit of the transcriber, and to enable the machine to be utilized by the dictator independently of the remote control feature if desired, but the remote control feature is superimposed upon the mechanism disclosed in Serial No. 281,811.

The invention of the present application is not confined in its utility to the illustrative machines of Serial Nos. 218,082 and 281,811.

Other objects and advantages will hereinafter appear.

In the drawings forming part of this specification:

Figure 4 is a fragmentary, sectional view taken upon the line 4—4 of Figure 2, looking in the direction of the arrows;

Figure 5 is a fragmentary, detail, sectional view illustrating switch controlling parts;

Figure 6 is a fragmentary, sectional view illustrating a clutch shifter;

Figure 7 is a fragmentary, detail, sectional view illustrating a portion of a motor for operating the machine between the "record" and "reproduce" conditions, and a clutch together with the clutch shifter of Figure 6, which is associated with the motor;

Figure 8 is a diagrammatic view illustrating electrical circuits employed in the machine for the purpose of remote control; and Figure 9 is a view generally similar to Figure 5, but illustrating a modified switch operating linkage for the recording and reproducing circuits.

Figure 1:
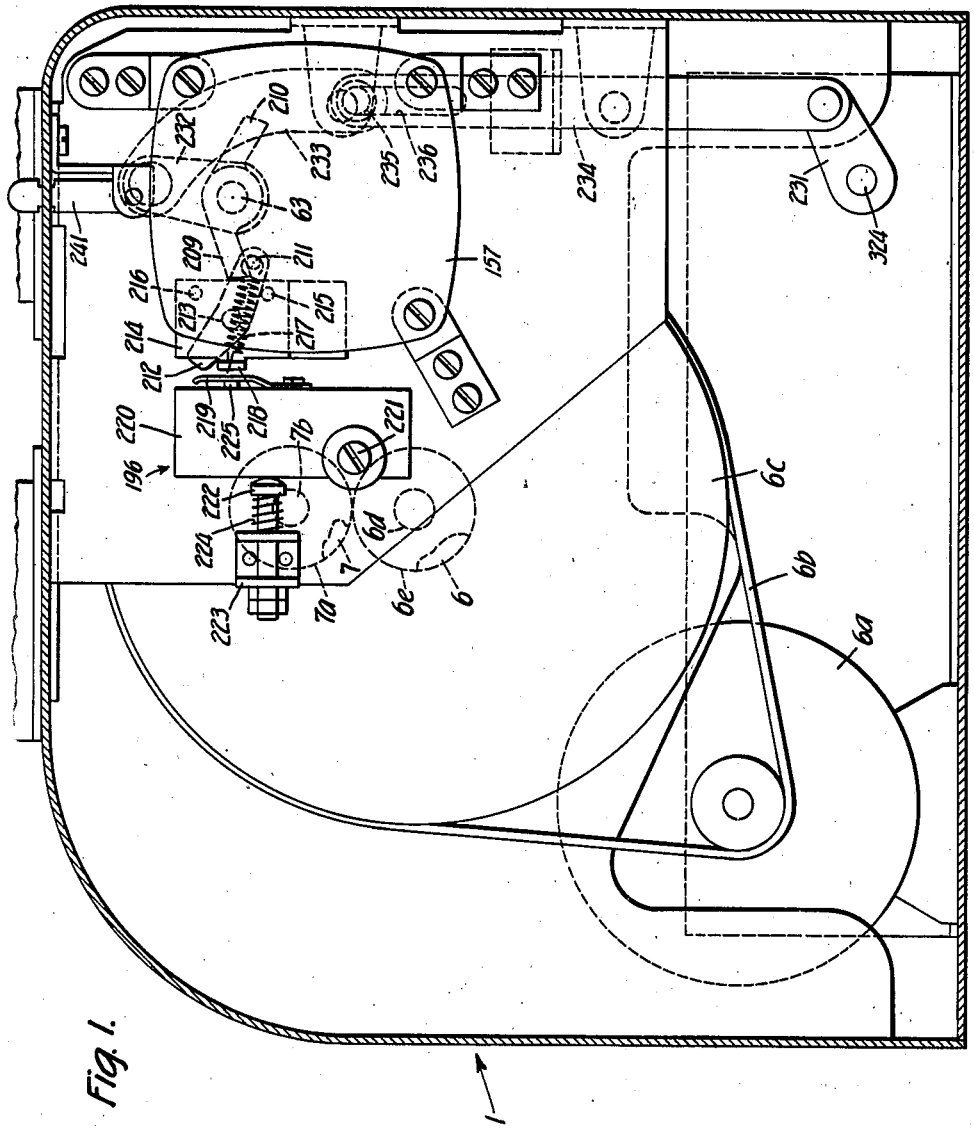
Figure 1 is a fragmentary view in sectional, side elevation of a machine embodying the invention, the section being taken on the line 1—1 of Figure 2, looking in the direction of the arrows.

As previously mentioned, the illustrative machine is generally like the machine disclosed and claimed in Serial No. 281,811. It comprises a frame structure 1 which carries a turtle-back support 2, Figure 4, upon which a thin, flexible disc record 3 may be mounted. The record 3 is impaled upon, and interfitted with, a center spindle 4, Figures 2 and 3, which spindle is mounted on a carriage 5. The record 3 is driven rotatively by a fixed feed wheel 6 and a cooperative feed wheel 7. The feed wheel 7 and its shaft 7b are revolubly supported in a rocker arm or frame 8, the arm 8 being rockably mounted upon a shaft 9 and provided with a tail extension 10 which may be lowered and raised to carry the feed wheel 7 away from and toward the record.

The motor 6a, Figure 1, is connected through a belt 6b to drive a pulley 6c, fast on the drive shaft 6d of the feed wheel 6. A hub portion 6e of the pulley 6c is adapted to engage and drive a disc 7a, fast on the shaft 7b of the feed wheel 7, when the wheel 7 is in record-engaging position.

Rotation of the record is transmitted to the center spindle 4 and thence through spiral gears 11 and 11a to a feed screw 12 which is mounted in the carriage 5 and which serves as the driving element for the carriage. The feed screw 12 is engageable with a half nut 13. The half nut 13 is carried at the forward end of an arm 14 fast on a shaft 15. The shaft 15 also has fast upon it an upwardly extending arm 16, which may be actuated to cause the half nut 13 to be rocked out of engagement with the feed screw 12 and into engagement with the feed screw 12. The nut arm 14 is immovable axially of the feed screw 12, and hence, when the half nut 13 is engaged with the feed screw, rotation of the feed screw causes the feed screw and its carriage to move in the direction of the axis of the feed screw and to carry the center spindle 4 away from the point at which the feed wheels 6 and 7 engage the record. As a result of the compound motion imparted to the record, a stationary recording stylus is caused to form a spiral sound track in the face of the record 3 which progresses outward from the center as the sound groove is scribed on the record by the stylus.

As in the case of the machine disclosed in Serial No. 281,811, it is desirable that a recording unit 17, including a recording stylus 18, be provided for forming the sound track on the record, and that a separate reproducing unit 19 including a reproducing stylus 20 to be provided for enabling the scribed sound track to be translated into sound.

The recording and reproducing units are mounted and controlled to enable the styluses 18 and 20 to be alternatively located at the same record-engaging point opposite a revoluble platen 21.

Figure 2:
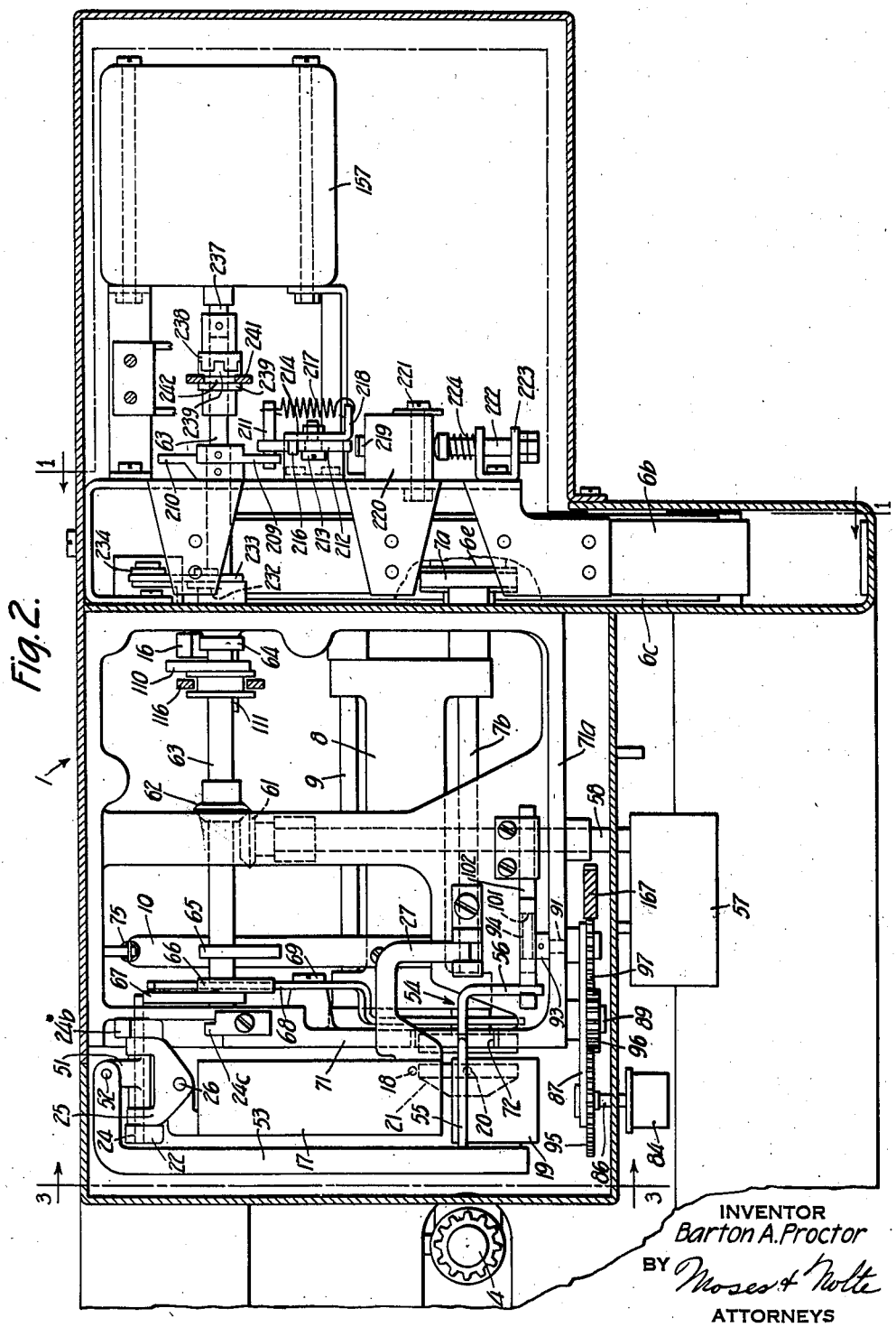
Figure 2 is a fragmentary, sectional, plan view taken upon the line 2—2 of Figure 1, looking in the direction of the arrows.

A yoke 22, Figures 2 and 4, rockably mounted upon a transverse horizontal shaft 23, extends upward, and pivotally supports the rear ends of the recorder unit 17 and the reproducer unit 19 through a pivot pin 24. A yoke 25, journaled on the pin 24, carries a vertical pivot pin 26 upon which the recorder unit 17 is mounted with capacity for transverse adjustment. The recorder 17 includes a bent guide arm 27 which extends rightward from the unit and thence forward, see Fig. 2.

An arm 51 is journaled upon the pin 24 between the ears of the yoke 25 and carries a vertically disposed pivot pin 52, upon which an angle arm 53 is journaled. The angle arm 53 has the reproducer unit 19 fixedly mounted upon its forward or free end. The arm 53 has also affixed to its forward end an arm or rod 54 which includes a shank portion 55 that extends toward the right in Figure 2, and an end portion 56 that extends toward the front of the machine.

Figure 3:
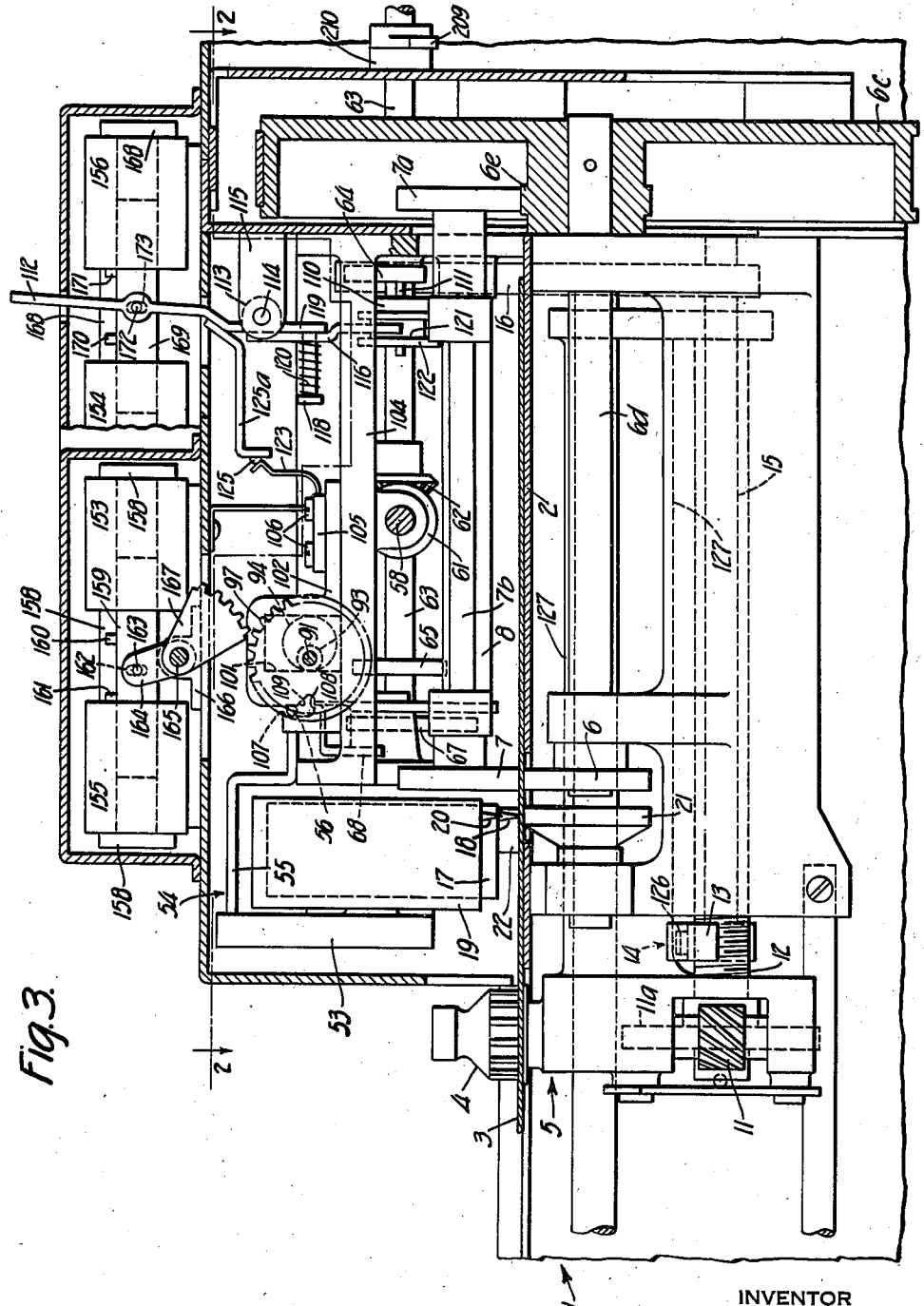
Figure 3 is a fragmentary, sectional view taken upon the line 3—3 of Figure 4, looking in the direction of the arrows.

As seen in Figure 3, the parts are in recording position with the recording stylus 18 engaging the record 3. The yoke 22 is held forward by a spring 22a, see Figure 4, with the arm 24b in engagement with an adjustably mounted stop 24c.

Selector or control mechanism comprises an operating finger piece 57 fast upon the forward end of a shaft 58. The finger piece may be operated to any one of three positions designated, respectively, as "Record," "Neutral" and "Reproduce." The shaft 58 has fixed to it a beveled pinion 61, Figure 2, which, through a meshing beveled pinion 62 fast on a cam shaft 63, serves to operate the cam shaft. The cam shaft 63 constitutes an operating member for the recording and reproducing units and is adapted to be operated to selected positions for bringing about the setting desired.

The cam shaft 63 has fast upon it four cams 64, 65, 66 and 67. Upon movement of the control knob 57 from the "record" position in Figure 2 to the "neutral" position, which is about one-quarter of a revolution of the shaft 58 counter-clockwise from the "record" position, the cam 65, Figure 2, comes into play, and by engagement with the tail member 10 of the arm 8 serves to carry the feed roller 7 out of engagement with the record 3, so that the driving of the record is immediately interrupted. The cam 66 next engages the tail portion of a lifting lever 68, which is rockingly mounted upon a fulcrum stud 69. The cam 66 depresses the tail portion of the lever 68 and causes a forwardly extending portion of the lever at the opposite side of the fulcrum to be raised. The forward end of the lifting lever engages the under face of the arm 27, which is affixed to the recording unit 17, thereby lifting the recording stylus 18 off the record. At its upward limit of movement, the forward end of the lifter lever 68 also engages the under side of the portion 55 of arm 54. When the forward end of the lifter lever 68 has attained this uppermost position, the parts are in "neutral" position and the record is stopped. The cam 64 has, in the meantime, been carried into engagement with the arm 16 to rock the shaft 15 and the nut arm 14 in a counter-clockwise direction, as viewed in Figure 4.

Thus in the "neutral" position the feed wheel 7 has left engagement with the record, both the recording and reproducing units are held up away from the record, and the feed nut 13 has been carried out of engagement with the feed screw 12.

If it is next desired to shift the parts to the position for reproducing, the control or selector member 57 is operated to the "reproduce" position, which is approximately one-half revolution of the shaft 58 counter-clockwise from the "neutral" position.

The cam 67, which has not up to now performed any function, comes into engagement with the pivot pin 24. The cam 67 pushes the pivot pin 24 to the rear, swinging the yoke 22 about the pivot pin 23, and causing the recording unit 17 and the reproducing unit 19 to be carried rearward. As a consequence of this movement, the stylus 20 is located over the record in the same vertical line previously occupied by the stylus 18. During this rearward movement, the lifter lever 68 engages the under face of the arm 27 and the under face of the portion 55 of the arm 54, so that both the recording unit 17 and the reproducing unit 19 are maintained in elevated positions by the lifter lever.

Both the arms 27 and 54 extend across a stationary plate 71, which has a notch or recess 72 formed in it. When the pivot pin 24 is in its forward position, the arm portion 55 of the arm 54 is disposed in advance of the notch 72 in position to be held up by the portion 73 of the plate 71 in front of the notch 72, and the arm 27 is over the notch or recess 72. When the pivot pin 24 has been shifted to the rear as just described, however, the arm portion 55 is carried over the notch 72, and the arm 27 is carried over the portion 74 of the plate 71 which lies to the rear of the notch 72. The cam 67, Figure 4, is formed with a dwell so that during the continued shifting of the control member 57 toward "reproduce" position the pivot pin 24 is held stationary.

Such continued movement, however, is effective to turn the cam 66 out of engagement with the lift lever 68 so that the reproducing unit is lowered to set the stylus 20 into engagement with the record, as in Figure 4, the recording unit 17 being at the same time held in elevated position by engagement of the arm 27 with the portion 74 of the plate 71. The cam 64 is carried downward by the cam shaft to a position permitting re-engagement of the half nut 13 with the feed screw 12. Finally, the cam 65 is carried to a position permitting the tail member 10 of the arm 8, which carries the feed wheel 7, to be actuated by a return spring 75, so that the feed wheel 7 is lowered against the record, and the normal driving of the record occurs.

It has been mentioned that the recording unit 17 is mounted for horizontal adjustment about the axis of the vertical pivot pin 26. Since this is normally a fixed adjustment, and since the adjustable feature has no direct bearing upon the invention of the present application, reference may be had to Serial No. 281,811 for the details of this feature.

The present machine also desirably includes means for stopping the record drive briefly or for an indefinite period without interrupting the engagement of the active stylus with the record and without interrupting the engagement of the feed nut 13 with the feed screw 12. While the mechanism for achieving this object is desirably present in the illustrative machine, it does not bear directly upon the present invention. Reference may be had to the specification and drawing of Serial No. 281,811 for a full disclosure of the feature.

The present machine also includes the back spacer mechanism of Serial No. 281,811 whereby the setting of the machine can be changed from that for recording or for normal reproduction to back space reproduction. The back spacing feature is important to the present invention, and a description of it will, therefore, be included. Since the present invention is concerned primarily with control of the machine by the dictator rather than the transcriber, the back spacing mechanism will be described primarily in its relation to the dictator rather than the transcriber. For example, there are times when the dictator wishes to go back a short distance and hear the last of the matter recorded on the record before continuing with the dictation. Provision is accordingly made for displacing the reproducing stylus 20 a measured distance to the left from its normal position, while the reproducing stylus is out of engagement with the record. The provision for back spacing further includes means for permitting the rotation of the record while preventing bodily movement of the record during the limited reproduction secured by back spacing, so that the record carriage will be held immovable during the back space reproduction.

In the present machine, as in the illustrative machine of Serial No. 281,811, a back spacing knob 84, together with an indicating member 85, is affixed to a shaft 86 in a plate 87. The plate 87 also surrounds a shaft 91 which is journaled in a frame member 71a. A hub 93 of an eccentric 94 is affixed to the shaft 91.

The shaft 86 has fast upon it a gear 95 which meshes with a gear 96 revolubly mounted upon a stub shaft 89. The gear 96 in turn meshes with a gear 97, the latter gear being affixed to the shaft 91. Rotation of the knob 84 is effective to carry the index pointer 85 across a graduated dial (not shown). Rotation of the knob 84 is also effective through the gears 95, 96 and 97 to rotate the shaft 91 and the eccentric 94. The eccentric 94 is disposed within a slot or notch 101 of a back spacing slide 102. The slide 102 is guided for right-line movement along a frame member 104, being held to the frame member by means of a hold-down block 105 and screws 106.

The slide 102 is formed with a vertically extending slot 107 (Figure 3) in which the forwardly extending portion 56 of the arm 54 is received. The slot 107 extends vertically, but has a lateral extension 108 at its lower end which extends toward the right. When the control member 57 is in its "neutral" position, the reproducing unit is elevated, and hence the arm portion 56 is in the vertical portion of the slot 107. At this time, operation of the knob 84 toward the left will be effective to carry the reproducing unit toward the left, the extent of leftward movement being indicated by the index member 85 and the cooperating dial.

If, after the reproducing unit 19 has been shifted to the left by operation of the knob 84, the control member 57 is operated to the "Reproduce" position, the record would be turned, but it would be at the same time translated as shown. When the reproduction secured by back spacing had been thus effected, it would not be possible to restore the back spacing mechanism and the reproducing stylus to the normal position corresponding to zero on the dial scale without skipping as many spaces or track turns on the record as were reproduced as a result of the back spacing operation. If the record carriage is held stationary, however, during the back space reproduction, the record will be rotated without translation and the arm portion 56 will simply be propelled by the spiral sound track into the lateral extension 108 of the slot 107 at back space reproduction. Provision is made for holding the record carriage against translation during back space reproduction, as will presently be described.

When the back space reproduction has been performed with the carriage thus held stationary, the operator may return the control member 57 to or through the neutral position. A cam formation 109 (Figure 3) just above the lateral extension 108 of the slot 107 causes the arm member 56 to be carried back into the upper vertical slot portion 107 as an incident of the lifting of the reproducing unit. The back spacing knob 84 may now be turned clockwise to the zero point on the scale, thereby restoring the stylus 20 to its normal position. The recording or reproducing may now be resumed normally with the recording and reproducing styluses in their normal relation to one another.

The mechanism for causing the record to be turned without translation at back space reproduction comprises a cam 110 (Figures 2, 3 and 4) which is mounted on the cam shaft 63 and interfitted with a rib or key 111 on the shaft 63. The cam 110 is free to move lengthwise of the shaft 63 but the cam and the shaft are constrained by the key or rib 111 to turn in unison. The normal position of the cam 110 is that illustrated in Figure 2, in which position the cam is out of line with the arm 16. The arm 16, it will be remembered, is fast upon a shaft 15, which shaft also has fast upon it the nut arm 14. As has already been mentioned, a cam 64 fast with the shaft 63 is constantly in line with the arm 16 and is effective when the control member 57 is operated to neutral position to rock the arm 16 rearward and thereby to lift the half nut 13 out of engagement with the feed screw 12.

When the cam shaft 63 is in the reproducing position, the arm 16 stands across the face of the cam 110, so that the cam 110 could not be operated longitudinally of the shaft 63 into transverse alignment with the arm 16. Control mechanism including a finger piece or lever 112, Figure 3, is provided for the cam 110, whereby the cam 110 can be operated into transverse alignment with the arm 16 when the control member 57 is in neutral or recording position, or can be biased when the control member 57 is in reproducing position to spring into transverse alignment with the arm 16 upon the operation of the cam shaft 63 to the neutral position.

The finger piece 112 is thus operated (toward the left) when back space reproduction is to be performed. By virtue of the arrangement just referred to, however, it may be operated either before or after the control member 57 has been operated to neutral position.

The finger piece 112 is affixed to ears 113 which are journaled upon a shaft 114 carried by a frame bracket 115. A clutch shifting fork 116 is also journaled upon the shaft 114. A headed pin 118 affixed to the lower end portion 119 of the finger piece 112 extends freely through the clutch shifting fork. A compression spring 120 surrounds the shank of the headed pin 118, bearing at one end against the head of the pin 118 and at the other end against the clutch shifting fork 116. The spring constrains the arm 119 and the fork 116 to move in unison, but permits separation of the arm 119 from the fork 116 when movement of the cam 119 is obstructed. The bifurcations of the fork 116 are received in a groove 121 of a cam shifting collar 122. The collar 122 is fast with the cam 110. A detent spring 123 affixed to a stationary frame bracket, coacts with a tooth 125 on an extension 125a on the finger piece 112 to oppose clockwise rocking of the finger piece 112 away from either the right-hand or left-hand position thereof (as viewed in Figure 3).

Assuming that the cam shaft 63 is in the reproducing position, counter-clockwise movement of the finger piece 112, as viewed in Figure 3, causes the lower end of the finger piece to be swung toward the right. Since the cam 110 is obstructed by the arm 16, the fork 116 is not free to follow the arm 119 and the arm 119 is separated from the fork 116 the spring 120 being put under stress. The finger piece 112 is detained in its left-hand position by the tooth 125 and the spring 123 to maintain the desired condition of the finger piece. When the cam shaft 63 is now operated to its neutral position, the arm 16 is pushed out of obstructing relation to the cam 110 by the cam 64, and the spring 120 forces the cam 110 toward the right and into transverse alignment with the arm 16.

When the back space knob 85 has been operated and the cam shaft 63 is again operated to place the reproducing stylus 20 in engagement with the record and to restore contact of the feed wheel 7 with the record, the cam 110 will prevent forward movement of the arm 16, and hence it will prevent engagement of the feed nut 13 with the feed screw 12.

Not only will the cam 110 prevent the arm 16 from shifting forward when the reproducing stylus 20 is lowered against the record but it will actually shift the arm 16 farther to the rear. As a consequence of this arrangement, the cam 110 serves to raise the nut arm 14 higher than it would be raised by the cam 64, with the result that a braking spring 126, Figure 4, affixed to the nut arm is pressed firmly against a carriage bar 127 to hold the carriage frictionally against unintended longitudinal movement.

Everything which has been described up to this point is present in the machine of Serial No. 281,811. The parts have described with reference to their manual operation because such provision for manual operation is retained in the present machine for the benefit of the transcriber.

For the benefit of the dictator, however, provision is made of relatively simple control means for switching the machine from a condition for recording to a condition for back space reproduction, and for restoring it from the condition for back space reproduction to the condition for recording. Such control means is desirably of a character such that the dictator may exercise the desired control over the machine and be informed of the condition of the machine even though the machine itself be located in another part of the room from the dictator or in a room remote from that of the dictator.

Without reference to detail, the principle of this remote control mechanism will first be briefly outlined. The control mechanism comprises two switches 151 and 152. The switch 151 may be operated to either of two circuit making positions. In one of its circuit making positions a solenoid 153 is energized for shifting the reproducing stylus toward the left in preparation for back space reproduction. A solenoid 154 is simultaneously energized for shifting the finger piece 112 toward the left so that the cam 110 will be shifted into alignment with the arm 16 or biased for shifting into alignment with the arm 16 upon subsequent operation of the cam shaft 63. These operations, as will be evident from the preceding description, are required when setting the machine for back space reproduction. The switch is not required to be retained in circuit making position, because the required operations are instantaneously performed.

In the other circuit making position of the switch member 151 a solenoid 155 is energized for shifting the reproducing stylus toward the right, that is, from the position for back space reproduction to the position required to be occupied by the stylus during normal reproduction. Operation of the switch member 151 to its second circuit making position also energizes a solenoid 156 for drawing the finger piece 112 toward the right and thereby shifting the cam 110 out of transverse alignment with the arm 16.

The second switch member 152 when operated to one of its circuit closing positions closes an energizing circuit of a reversible motor 157 to drive the cam shaft 63 from the recording position of the cam shaft to the reproducing position thereof, and the movement of the switch member 152 to its second circuit closing position closes a second circuit to the reversible motor 157 and causes the motor to operate in the opposite direction and thereby to move the cam shaft 163 from the reproducing position to the recording position.

It will be useful to note before proceeding with the detailed description of the means whereby the above described operations are brought about to point out the practical conditions confronting the dictator who is dictating to a machine located in another room, and the operations actually required to be performed by him in meeting those conditions.

The dictator will ordinarily be concerned only with the establishment of recording conditions and of back space reproducing conditions. Occasionally, but probably not often, he will wish to listen back to a substantial portion of the record; for example, when he is interrupted in the course of dictation.

Under ordinary conditions, the dictator upon starting to dictate should first see that the switch member 152 is in the recording position and then operate the switch 151 momentarily to the back space circuit closing position and permit it to return to neutral. Such operation of the switch 151 moves the cam 110 into transverse alignment with the arm 16 and moves the reproducing stylus 20 which is out of contact with the record toward the left. It has no effect upon the recording stylus 18, nor upon the fact that the machine is set for recording. The dictation may now proceed normally until the dictator decides that he wants to listen back to that limited portion of the dictation which he is able to hear through back space reproduction. He thereupon shifts the switch 152 to the reproducing position, whereupon back-space reproduction is effected. Having heard the last portion of the recording repeated, and being ready to resume dictation, he returns the switch 152 to the recording position. So long as nothing more than these two conditions are required it is not necessary again to actuate the switch 151.

Should the dictator, however, wish to listen in to a more extensive portion of the recording than is made available by back-spacing, he will telephone to the machine supervisor to set the machine back to the beginning of his dictation or to the extent which he estimates is necessary to enable him to hear what he wants to hear. At this time the setting of the machine may be assumed to be that for recording. When the machine has been set back, the dictator will operate the switch 151 to the circuit closing position for normal reproduction and let it return to neutral. Then he will operate the switch 152 to the reproducing position and will listen up to the end of the matter recorded. When this point is reached, the switch 152 may be returned to the recording position and the dictation may be resumed without further ado. Since it is to be assumed, however, that he will ordinarily require back space reproduction, he may desirably at this time operate the switch 151 momentarily to the back-space circuit closing position to avoid the possibility of later overlooking the necessity for such operation.

In addition to the switches 151 and 152, the dictator desirably has under his supervision a start-stop switch, as disclosed in Serial No. 281,-811, for interrupting either recording or reproducing at will. The technic of controlling the three switches referred to is very simple and, therefore, easy to learn and easy to remember.

The solenoids 155 and 153 are mounted in axial alignment with one another upon a bracket member 158. These solenoids have a common armature member 159 which is provided with stops 160 and 161 for limiting movement of the armature toward the right and toward the left, respectively, by engagement with rigid non-conducting end members of the solenoids. The armature member 159 has a slot 162 in which plays a pin 163 carried by upstanding arms of a yoke 164, Figures 3 and 4. The yoke 164 is fast with a shaft 165 which is supported in a bearing 166. The shaft 165 also has fast upon it a gear segment 167 which is normally held frictionally out of engagement with the gear 97 to the right of engaging position, Figure 3, but which is moved to operate the gear 97 counter-clockwise as the armature 159 moves toward the right, and clockwise as the armature 159 moves toward the left. It will be remembered that the gear 97 is connected to drive an eccentric or cam 94 whereby the back spacing slide 102 is operated.

The solenoids 154 and 156 are similarly mounted upon a bracket 168 in axial alignment with one another, and are similarly provided with a common armature member having stops 170 and 171. The finger piece or armature 112 has affixed to it a pin 172 which plays in a slot 173 formed in the armature 169. The armature 169 is drawn toward the left by energization of the solenoid 154, and toward the right by energization of the solenoid 156.

Current for energizing the solenoids 153, 154, 155, 156 is supplied from conductor mains 174 and 175, Figure 8. The main 174 is constantly connected through a conductor 176 to a movable contact member 177 of the switch 151. This switch is normally biased to the neutral position illustrated in Figure 8 in any conventional way, and returns to that position as soon as the switch handle is released.

When the switch member 177 is moved into engagement with a contact 178, current flows through a conductor 179 and a conductor 180 to the solenoid 156, thence through a conductor 181 and a conductor 182 back to the main 175. It also flows in a parallel path from the conductor 179 to the conductor 183, through the solenoid 155, and thence through a conductor 184 and the conductor 182 back to the main 175.

When the switch member 177 is moved into engagement with a contact 185, current flows through a conductor 186 and a conductor 187 to the solenoid 154, and thence through a conductor 188 and the conductor 182 back to the main 175. It also flows in parallel from the conductor 186 to a conductor 189 through the solenoid 153, and thence through a conductor 190 and the conductor 182 back to the main 175.

Current for energizing the motor 157 is also supplied from the mains 174 and 175. The main 174 is connected through a conductor 191, Figure 8, to a movable switch member 192 of switch 152. When this movable switch member is moved into engagement with a contact 193, current flows through a conductor 194 to the motor 157. It flows thence along a conductor 195 to a switch device 196, see Figure 1 also, which will be described in detail.

At the time when the switch member 152 is moved from the recording position to the reproducing position so as to establish engagement of the switch contacts 192 and 193, the switch member 197 is in engagement with a contact 198 of a conductor 199. The current, therefore, flows through the conductor 199 to a contact 200, and thence along a movable switch member 201 of the switch 152 which is constantly connected through a conductor 202 to the main 175.

The movable switch members 192 and 201 of the switch 152 are physically connected to move in unison with one another by an insulating connecting rod 203, or in any other suitable manner. The flow of the current through the motor in the manner described operates the motor in a direction to move the cam shaft 63 from the recording position to the reproducing position. As the cam shaft reaches the reproducing position it is effective, through means which will presently be described, to cause switch contact member 197 to be shifted out of engagement with the contact 198 and into engagement with a contact 204 of a conductor 205. The conductor 205 is open circuited because the switch member 201 is in its upper position as illustrated in Figure 8, and hence the circuit to the motor is broken and the motor is stopped.

When subsequently it is desired to operate the cam shaft 63 back to the recording position, the switch 152 is operated to carry the switch member 192 out of engagement with the contact 193 and into engagement with a contact 206 of a conductor 207 which runs to the motor. Operation of the switch also carries the movable switch member 201 out of engagement with the contact 200 and into engagement with a contact 208 of the conductor 205. A circuit is thereby established from the main 174 through a conductor 191, switch member 192, contact 206, conductor 207, motor 157, conductor 195, switch member 197, contact 204, conductor 205, contact 208, switch member 201, and conductor 202 back to the main 175. The motor is thereby energized to move the cam shaft from the reproducing position to the recording position.

As the cam shaft reaches the recording position the switch member 197 is moved out of engagement with the contact 204 to open circuit the motor, and is moved into engagement with the contact 198 to make the motor operable in the reverse direction when the switch 152 is next operated to engage switch members 192 and 201 with the contacts 193 and 200, respectively.

For bringing about movement of the switch member 197 in the manner described, the cam shaft 63 has fast upon it a pair of arms 209 and 210, Figures 1 and 2, for coacting with a pin 211 carried by the tail portion of a snap lever 212. The snap lever 212 is pivotally supported upon a bearing member 213 carried by a bracket 214. Clockwise turning of the snap lever 212 (as viewed in Figure 1) is limited by a lower pin 215 affixed to the bracket 214, and counter-clockwise movement of the lever is limited by engagement with an upper pin 216 affixed to the bracket 214. A tension spring 217 is connected at one end to the pin 211 and at the other end to an ear 218 formed on the bracket 214.

As viewed in Figure 1 the lever 212 is at its clockwise limit of movement, the position which it normally occupies when the parts are set for reproducing. Upon movement of the switch 152 to the reproducing position, the shaft 63 will be rotated by the motor in a clockwise direction, so that the arm 210 will be moved around underneath the pin 211 to raise the tail of the lever 212. As soon as the line of centers connecting the axes of the pin 211 and the bearing member 213 crosses the axis of the spring 217, the lever 212 is snapped to its counterclockwise limit of movement, being arrested by the stop pin 216, Figure 5. In performing this movement, the nose of the lever 212 is caused to press against a spring leaf 219 which is affixed to a casing element 220 of the switch device 196. The casing member 220 is pivotally mounted upon a bolt 221 with freedom to rock toward the left as viewed in Figure 1. The casing is yieldingly supported against such rocking movement by means of a bolt 222 which is slidingly mounted in a frame bracket 223, and which is urged toward the right by a compression spring 224 which surrounds the shank of the bolt portion and which is interposed between the bracket 223 and the head of the bolt.

A thrust pin 225 is guided in the casing 220 for engaging and flexing the switch member 197. Pressure of the nose of the lever 212 against the spring leaf 219 serves to bend the switch member 197 over into engagement with the contact 198. When that movement is completed, the switch device 196 may rock slightly toward the left, Figures 1 and 8, against the resistance of the spring 224, to prevent damage to the switch member 197 and at the same time assure firm engagement of it with the contact 198.

When the cam shaft 63 has been operated in a clockwise direction as described, it may be operated in a counter-clockwise direction to return it to the reproducing position by moving the switch member 152 to the reproducing position as illustrated in Figure 8. In the latter part of this movement the arm 209 engages the pin 211 to rock the lever 212 in a clockwise direction. As soon as the line of centers of the pin 211 and the bearing member 213 crosses the axis of the spring 217, the lever 212 is snapped clockwise to the position illustrated in Figures 1 and 8, thereby breaking the circuit to the motor and restoring the initial or reproducing condition of the parts.

In application Serial No. 218,082 disclosure is made of means operated by the cam shaft 135 for altering the voice current circuits to establish one set of connections when the recording unit is effective and another set of connections when the reproducing unit is effective. As shown in Figure 20 of said application this operation is effected through a crank 231 fast upon a switch operating shaft 324. A corresponding crank 231 and switch controlling shaft 324 are provided in the present machine for the same purpose as in Serial No. 218,082. The circuits controlled may also desirably be the same as those illustrated and described in Serial No. 218,082.

In the present machine the cam shaft 63 has fast upon it a crank 232, Figures 12 and 5, which is pivotally connected to a link 233. The link 233 has lost motion connection with a connecting rod 234, the link being provided with a pin 235 which plays in a longitudinal slot 236 at the upper end of the connecting rod. The lower end of the connecting rod is pivotally connected to the crank 231. The parts are illustrated in reproducing position in Figure 1 and in recording position in Figure 5. The described train of connections is effective to produce the desired rocking of the shaft 324.

By pivoting the link 233 on the arm 232 interference with the shaft 63 is avoided when it extends beyond the arm 232. In a machine as illustrated in application Serial No. 218,082, in which the shaft 63 does not extend beyond the arm 232 an alternative arrangement may be used as illustrated in Figure 9. Here the cam shaft 63A has fast upon it a crank 232A which is provided with a pin 235A. The pin 235A plays in a slot 236A of a connecting rod 234A which is pivotally connected to a crank 231A fast on a switch controlling shaft 324A. The operation and function of the shaft 324A is the same as that of the shaft 324. As the arm 231A reaches its lowermost position, the upper end of the link 234A is free to swing past the end of shaft 63A.

It will be remembered that the transcriber is not interested when using the machine for transcription purposes in setting it for recording, but that the transcriber is interested in setting it either for normal reproduction or for back space reproduction. The motor 157 includes reduction gearing, and hence, if mounted fast on the cam shaft 63, would throw an added burden upon the transcriber who is required to operate the shaft 63 from the reproducing position to the neutral position and back to the reproducing position again.

In order to avoid this unnecessary load with its attendant slowing down of the work, the motor 157 is connected to the cam shaft 63 through a releasable clutch which is under the control of the transcriber at the machine. The motor output shaft 237 has affixed to it a toothed clutch member 238, Figures 2 and 7, which is normally in mesh with a mating clutch member 239. The latter clutch member is connected to the cam shaft 63 through a rib or key 240 on the cam shaft and a slot formed in the clutch member, so that the clutch member is constrained to rotate in unison with the cam shaft, but is free to be shifted longitudinally of the latter. A clutch shifting fork 241 engages in a groove 242 of the clutch member 239 for shifting the member 239 into and out of mating relation with the clutch member 238.

The fork 241 is impaled upon a bolt or pin 243, which bolt is mounted in ears 244 and 245 of a bracket 246. An enlarged portion 247 of the bolt or pin 243 stands between the fork 241 and the ear 245. A compression spring 248 surrounds the pin 243 between the fork 241 and the ear 244 and urges the fork toward the right as viewed in Figure 7. The fork has an upper end portion projecting above the casing which extends to an accessible position where it may serve as an operating finger piece for pulling the clutch member 239 out of engagement with the clutch member 238 and holding while the cam shaft 63 is manually operated by the control member 57 from recording position to neutral position and back to recording position again.

As a matter of convenience for the transcriber and to simplify the operation, a switch 249 is desirably provided at the machine in parallel with the switch 151. A conductor 250 runs from the conductor 176 to a movable switch member 252 of switch 249. The switch member 252 may be moved into engagement with a contact 253 of conductor 179 to energize solenoids 155 and 156 simultaneously, or into engagement with a contact 254 of conductor 186 to energize solenoids 153 and 154 simultaneously. The provision of the switch obviates the necessity for separately actuating the back space slide 102 and the cam 110.

Thus when the machine is set for normal reproduction and back space reproduction is desired, it is only necessary to operate the control member 57 to neutral position, then close the switch 249 upon contact 254 momentarily, and restore control member 57 to the reproducing position. Similarly, when the machine is set for back space reproduction and normal reproduction is desired, it is only necessary to shift the control member 57 to neutral position, close the switch 249 momentarily upon the contact 253, and then return the control member 57 to reproducing position.

I have described what I believe to be the best embodiments of my invention. I do not wish, however, to be confined to the embodiments shown, but what I desire to cover by Letters Patent is set forth in the appended claims.

I claim:

1. In a dictation machine, in combination, means for driving a record, means for recording on the record including a recording stylus, means for reproducing from the record including a reproducing stylus, said styluses adapted for alternative engagement with the record, control means remote from the machine and accessible to the dictator and settable to one condition at a single operation, a common operating member responsive to such setting to operate the recording means to an ineffective condition with the recording stylus out of engagement with the record and to operate the reproducing means to an effective condition with the reproducing stylus in engagement with the record, said remote control means being also settable to another condition at another single operation, and said common operating member being responsive to the latter setting to operate the reproducing means to an ineffective condition with the reproducing stylus out of engagement with the record and to operate the recording means to an effective condition with the recording stylus in engagement with the record, and means actuated by the common operating member for rendering the record driving means ineffective as either stylus is disengaged from the record and for rendering the record driving means effective as either stylus is moved into engagement with the record.

2. In a dictation machine, in combination, means for driving a record, means for recording on the record including a recording stylus, means for reproducing from the record including a reproducing stylus, said styluses adapted for alternative engagement with the record, a single control member remote from the machine and accessible to the dictator and settable to one position at a single operation, a common operating member responsive to such setting to operate the recording means to an ineffective condition with the recording stylus out of engagement with the record and to operate the reproducing means to an effective condition with the reproducing stylus in engagement with the record, said remote control member being also settable to another position at another single operation, and said common operating member being responsive to the latter setting to operate the reproducing means to an ineffective condition with the reproducing stylus out of engagement with the record and to operate the recording means to an effective condition with the recording stylus in engagement with the record and means actuated by the common operating member for rendering the record driving means ineffective as either stylus is disengaged from the record and for rendering the record driving means effective as either stylus is moved into engagement with the record.

3. In a dictation machine which includes means for driving a record, means for recording on the record including a recording stylus, and means for reproducing from the record including a reproducing stylus, said styluses adapted for alternative engagement with the record, the improvement which comprises, in combination, control means remote from the machine and accessible to the dictator and settable to one condition effective at a single operation, a common operating member responsive to such setting to operate the recording means to an ineffective condition with the recording stylus out of engagement with the record and to operate the reproducing means to an effective condition with the reproducing stylus in engagement with the record, said remote control means being also settable to another condition at another single operation, and said common operating member being responsive to the latter setting to operate the reproducing means to an ineffective condition with the reproducing stylus out of engagement with the record and to operate the recording means to an effective condition with the recording stylus in engagement with the record, means including an additional control member remote from the machine and accessible to the dictator for setting the reproducing stylus forward or back when it is out of engagement with the record, to cause it to be set into engagement with the record by operation of the first mentioned control means either in a position for normal reproduction or for back space reproduction as desired, and means actuated by the common operating member for rendering the record driving means ineffective as either stylus is disengaged from the record and for rendering the record driving means effective as either stylus is moved into engagement with the record.

4. In a dictation machine, in combination, means for rotating a record, means for normally translating the record as an incident of such rotation, means for reproducing from the record including a reproducing stylus, means supporting the stylus with capacity for movement into and out of engagement with the record and also with capacity for advancing movement imparted by the record when the record is rotated without translation, disabling means normally ineffective but settable to cause the record translating means to be disabled as the reproducing stylus is moved into engagement with the record and to be held disabled during back space reproduction, back spacing means actuable to effect relative movement of the record and the reproducing stylus to bring about a back space setting of the reproducing stylus relative to the record while the reproducing stylus and the record are disengaged, and means including a single control member effective at a single operation to render said disabling means effective and to actuate said back spacing means.

5. In a dictation machine, in combination, means for rotating a record, means for normally translating the record as an incident of such rotation, means for reproducing from the record including a reproducing stylus, means supporting the stylus with capacity for movement into and out of engagement with the record and also with capacity for advancing movement imparted by the record when the record is rotated without translation, disabling means normally ineffective but settable to cause the record translating means to be disabled as the reproducing stylus is moved into engagement with the record and to be held disabled during back space reproduction, back spacing means actuable to effect relative movement of the record and the reproducing stylus to bring about a back space setting of the reproducing stylus relative to the record while the reproducing stylus and the record are disengaged, and means effective at a single operation to render said disabling means ineffective and to eliminate a back space setting.

6. In a dictation machine, in combination, means for rotating a record, means for normally translating the record as an incident of such rotation, means for reproducing from the record including a reproducing stylus, means supporting the stylus with capacity for movement into and out of engagement with the record and also with capacity for advancing movement imparted by the record when the record is rotated without translation, disabling means normally ineffective but settable to cause the record translating means to be disabled as the reproducing stylus is moved into engagement with the record and to be held disabled during back space reproduction, back spacing means actuable to effect relative movement of the record and the reproducing stylus to bring about a back space setting of the reproducing stylus relative to the record while the reproducing stylus and the record are disengaged, and means effective at a single operation to render said disabling means effective and to actuate said back space means to produce a back space setting, and at another single operation to render said disabling means ineffective and to eliminate a back space setting.

7. In a dictation machine which includes a record support, record driving means, a recording unit comprising a recording stylus, and a reproducing unit comprising a reproducing stylus, in combination, means for placing the styluses alternatively in engagement with the record comprising a common operating member for the recording and reproducing units, a reversible electric motor for driving the operating member from a recording position to a reproducing position, and from the reproducing position to the recording position, control circuit means for the motor including a manual control member, automatic circuit control means operated by the operating member to open circuit the motor as the operating member arrives in either recording or reproducing position, and means actuated by the common operating member for rendering the record driving means ineffective as either stylus is disengaged from the record and for rendering the record driving means effective as either stylus is moved into engagement with the record.

8. In a dictation machine which includes a record support, record driving means, a recording unit comprising a recording stylus, and a reproducing unit comprising a reproducing stylus, in combination, means for placing the styluses alternatively in engagement with the record comprising a common operating member for the recording and reproducing units, a reversible electric motor for driving the operating member from a recording position to a reproducing position, and from the reproducing position to the recording position, control circuit means for the motor including a manual control member, automatic circuit control means operated by the operating member to open circuit the motor as the operating member arrives in either recording or reproducing position, and to set the circuit means so that the operating member will be driven by the motor to the other of said positions in response to a further operation of the manual control member, and means actuated by the common operating member for rendering the record driving means ineffective as either stylus is disengaged from the record and for rendering the record driving means effective as either stylus is moved into engagement with the record.

9. In a dictation machine which includes a record support, record driving means, a recording unit comprising a recording stylus, and a reproducing unit comprising a reproducing stylus, in combination, means for placing the styluses alternatively in engagement with the record comprising a common operating member for the recording and reproducing units, a reversible electric motor for driving the operating member from a recording position to a reproducing position, and from the reproducing position to the recording position, control circuit means for the motor including a manual control member operable selectively to either of two alternative circuit making positions according to the setting of the operating member desired, automatic circuit control means operated by the operating member to open circuit the motor as the operating member arrives in either recording or reproducing position with the control member in one of its circuit making positions, and to set the circuit means so that the control member is required to be operated to the other of its circuit making positions to reestablish energization of the motor, and means actuated by the common operating member for rendering the record driving means ineffective as either stylus is disengaged from the record and for rendering the record driving means effective as either stylus is moved into engagement with the record.

10. In a dictation machine which includes a record support, a recording unit comprising a recording stylus, and a reproducing unit comprising a reproducing stylus, in combination, means for placing the styluses alternatively in engagement with the record comprising a common operating member for the recording and reproducing units, a reversible motor for driving the operating member in one direction to a recording position and in the other direction to a reproducing position, control circuit means for the motor including a manual control member, automatic circuit control means operated by the operating member to open circuit the motor as the operating member arrives in either recording or reproducing positions, and means actuated by the common operating member for rendering the record driving means ineffective as either stylus is disengaged from the record and for rendering the record driving means effective as either stylus is moved into engagement with the record.

11. In a dictation machine which includes a record support, record driving means, a recording unit comprising a recording stylus, and a reproducing unit comprising a reproducing stylus, in combination, means for placing the styluses alternatively in engagement with the record comprising a common operating member for the recording and reproducing units, a reversible motor for driving the operating member in one direction to a recording position and in the other direction to a reproducing position, control circuit means for the motor including a manual control member, automatic circuit control means operated by the operating member to open circuit the motor as the operating member arrives in either recording or reproducing position with the control member in a corresponding circuit making position, and to alter the circuit means so that the control member is required to be operated to the other of its circuit making positions in order to bring about further operation of the operating member, and means actuated by the common operating member for rendering the record driving means ineffective as either stylus is disengaged from the record and for rendering the record driving means effective as either stylus is moved into engagement with the record.

12. In a dictation machine which includes a record support, a recording unit comprising a recording stylus, and a reproducing unit comprising a reproducing stylus, in combination, means for placing the styluses alternatively in engagement with the record comprising a common operating member for the recording and reproducing units, a motor for driving the operating member from a recording position to a reproducing position, and from the reproducing position to the recording position, control circuit means for the motor including a manual control member, a clutch normally connecting the motor with the operating member, and means for disengaging the clutch to permit manual operation of the operating member independently of the motor.

BARTON A. PROCTOR.